(12) United States Patent
Yen et al.

(10) Patent No.: US 11,418,098 B2
(45) Date of Patent: Aug. 16, 2022

(54) ROTOR, MOTOR, AND DRIVING APPARATUS

(71) Applicant: NIDEC CORPORATION, Kyoto (JP)

(72) Inventors: Sheng-Chan Yen, Taipei (TW); Guo-Jhih Yan, Taipei (TW); Ta-Yin Luo, Taipei (TW); Yu-Wei Hsu, Taipei (TW); Hsin-Nan Lin, Taipei (JP); Cheng-Tsung Liu, Kaohsiung (TW)

(73) Assignee: NIDEC CORPORATION, Kyoto (JP)

( * ) Notice: Subject to any disclaimer, the term of this patent is extended or adjusted under 35 U.S.C. 154(b) by 196 days.

(21) Appl. No.: 16/847,662

(22) Filed: Apr. 14, 2020

(65) Prior Publication Data

US 2020/0412217 A1 Dec. 31, 2020

(30) Foreign Application Priority Data

Jun. 28, 2019 (CN) .......................... 201910575266.1

(51) Int. Cl.
*H02K 21/22* (2006.01)
*H02K 1/276* (2022.01)
*H02K 15/02* (2006.01)

(52) U.S. Cl.
CPC ............ *H02K 21/22* (2013.01); *H02K 1/276* (2013.01); *H02K 15/024* (2013.01)

(58) Field of Classification Search
CPC ...... H02K 15/03; H02K 15/024; H02K 1/276; H02K 21/22

USPC .............................. 310/40 R, 156.53, 156.56
See application file for complete search history.

(56) References Cited

U.S. PATENT DOCUMENTS

| | | | |
|---|---|---|---|
| 6,815,859 B2 | 11/2004 | Sakuma et al. | |
| 2008/0018190 A1 | 1/2008 | Takahata et al. | |
| 2017/0144693 A1* | 5/2017 | Okubo | .................. B62D 5/046 |
| 2020/0136451 A1 | 4/2020 | Zeichfussl | |

FOREIGN PATENT DOCUMENTS

| | | | |
|---|---|---|---|
| CN | 103095078 A | 5/2013 | |
| CN | 106655572 A | 5/2017 | |
| EP | 3379696 A1 * | 9/2018 | ............. F03D 80/80 |
| JP | 5208662 B2 * | 6/2013 | ............... H02K 1/27 |

* cited by examiner

*Primary Examiner* — Terrance L Kenerly
(74) *Attorney, Agent, or Firm* — Hauptman Ham, LLP

(57) ABSTRACT

Embodiments of the disclosure provide a rotor, a motor, and a driving apparatus. The rotor is defined by laminated electromagnetic steel plates. The electromagnetic steel plate includes a plurality of through hole groups running through the electromagnetic steel plate, and each through hole group includes a plurality of through holes. A central axis of a magnetic pole of the rotor is used as a d axis, and an axis that is 45 degrees from the d axis is used as a q axis, where an outer peripheral surface of the rotor that is between the d axis and the q axis is recessed radially inward relative to an outer peripheral surface of another portion of the rotor, so that the rotor is noncircular when observed in an axial direction.

11 Claims, 5 Drawing Sheets

ROTOR, MOTOR, AND DRIVING APPARATUS

The present invention claims priority under 35 U.S.C. § 119 to Chinese Application No. 201910575266.1 filed on Jun. 28, 2019 the entire content of which is incorporated herein by reference.

FIELD OF THE INVENTION

The disclosure relates to a rotor, a motor, and a driving apparatus.

DESCRIPTION OF THE RELATED ART

In a rotor of a conventional synchronous reluctance motor, there are a plurality of through holes in the electromagnetic steel plates forming the rotor. These through holes form air gaps called flux barriers. These air gaps cause a reluctance difference. When the motor is powered on, reluctance torque is generated due to the reluctance difference.

In order to further improve efficiency of the motor and increase a power coefficient of the motor, in the related art, a magnet is usually inserted in the flux barriers to generate extra flux and contribute flux torque. Therefore, the output of the motor includes a combination of the reluctance torque and the flux torque, thereby achieving relatively high efficiency.

Therefore, in the existing magnet-assisted synchronous reluctance motor, the flux barriers of the synchronous reluctance motor are usually filled with as many magnets as possible. However, although the output efficiency of the motor may be improved by filling the motor with magnets, it may not achieve the most economical utilization. Moreover, too many magnets may saturate a flux path, reduce an inductance difference, and reduce the torque that may be output by the motor. In addition, too many magnets cause troubles in motor manufacturing and assembly, which increases the manufacturing costs and reduces practicality.

It should be noted that the introduction in Background is merely provided for the convenience of clearly and comprehensively describing the technical solutions of the disclosure and facilitating the understanding of those skilled in the art. These technical solutions shall not be deemed well-known by those skilled in the art simply for having been described in Background.

The inventors found that because a corresponding current angle (a current phase angle) when maximum flux torque is generated is different from a corresponding current angle (a current phase angle) when maximum reluctance torque is generated, no matter how a proportion of magnets or a proportion of widths of magnets is limited in the related art, the actual value of the combination of reluctance torque and flux torque is always less than the pure total sum of the reluctance torque and the flux torque, and consequently, the combination of the reluctance torque and the flux torque is not optimized.

SUMMARY OF THE INVENTION

According to an exemplary embodiment of the present disclosure, a rotor is provided. The rotor is defined by laminated electromagnetic steel plates. The electromagnetic steel plate includes a plurality of through hole groups running through the electromagnetic steel plate, and each through hole group includes a plurality of through holes. A central axis of a magnetic pole of the rotor is used as a d axis, and an axis that is 45 degrees from the d axis is used as a q axis, where an outer peripheral surface of the rotor that is between the d axis and the q axis is recessed radially inward relative to an outer peripheral surface of another portion of the rotor, so that the rotor is noncircular when observed in an axial direction.

According to an exemplary embodiment of the present disclosure, a motor is provided. The motor is a motor that rotates in a single direction, and the motor includes: a rotating shaft extending along a central axis; a stator is defined by laminated iron cores, and including pole slots arranged in a circumferential direction, teeth defined between adjacent pole slots, and coils accommodated in the pole slots; and the rotor according to the first aspect, where the rotor rotates around the rotating shaft.

According to an exemplary embodiment of the present disclosure, a driving apparatus is provided. The driving apparatus includes the motor according to the second aspect.

The above and other elements, features, steps, characteristics and advantages of the present disclosure will become more apparent from the following detailed description of the preferred embodiments with reference to the attached drawings.

DETAILED DESCRIPTION OF THE PREFERRED EMBODIMENTS

The foregoing and other features of the disclosure will become apparent from the following specification with reference to the accompanying drawings. Specific embodiments of the disclosure are disclosed in the specification and the accompanying drawings. The specification and the accompanying drawings describe several embodiments to which the principles of the disclosure are applicable. However, it should be understood that, the disclosure is not limited to the embodiments described herein, but shall include all modifications, variations and equivalents falling within the scope of the appended claims.

In the embodiments of the disclosure, terms such as "first" and "second" are used to distinguish different elements in terms of names, and are not used to indicate a spatial arrangement or a time sequence of these elements, and these elements should not be limited by these terms. The term "and/or" includes any and all combinations of one or more of listed associated terms. Terms such as "comprise", "include", and "have" refer to the existence of the described features, elements, devices or components, but do not exclude the existence or addition of one or more other features, elements, devices or components.

In the embodiments of the disclosure, singular forms such as "a/an" and "the" include plural forms and should be understood in a broad sense as a meaning of "a type" or "a kind" instead of "one". In addition, the term "the" should be understood as including both a singular form and a plural form, unless otherwise clearly stated in the context. In addition, the term "according to" should be understood as "at least partially according to . . . ", and the term "based on" should be understood as "at least partially based on . . . ", unless otherwise clearly stated in the context.

In the following description of the disclosure, for convenience of description, a direction extending along or parallel to a central axis of a motor is referred to as an "axial direction", a direction of a radius that is centered on the central axis is referred to as a "radial direction", and a direction around the central axis is referred to as a "circumferential direction". However, these definitions are only for convenience of description and are not intended to limit the directions of the motor during manufacturing and in use.

The embodiments of the first aspect of the disclosure provide a rotor.

Figure 1:
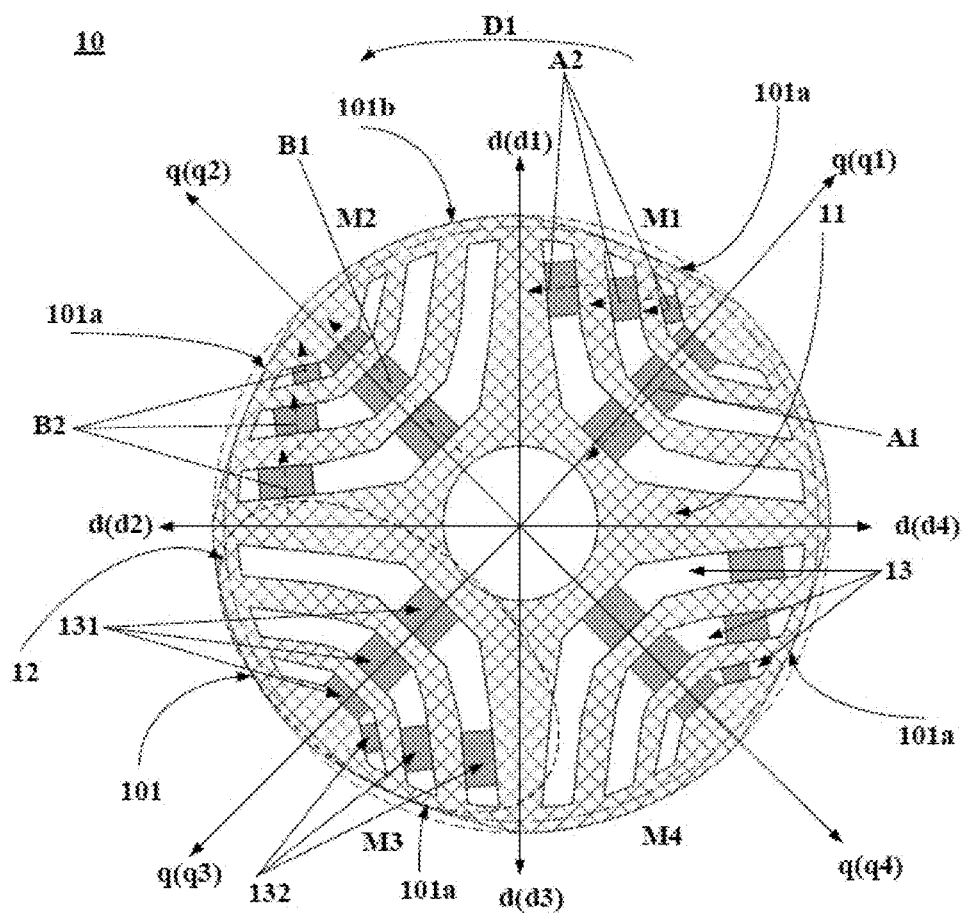
FIG. 1 is a top view of an exemplary embodiment of a rotor according to embodiments of the first aspect of the disclosure.
Figure 2:
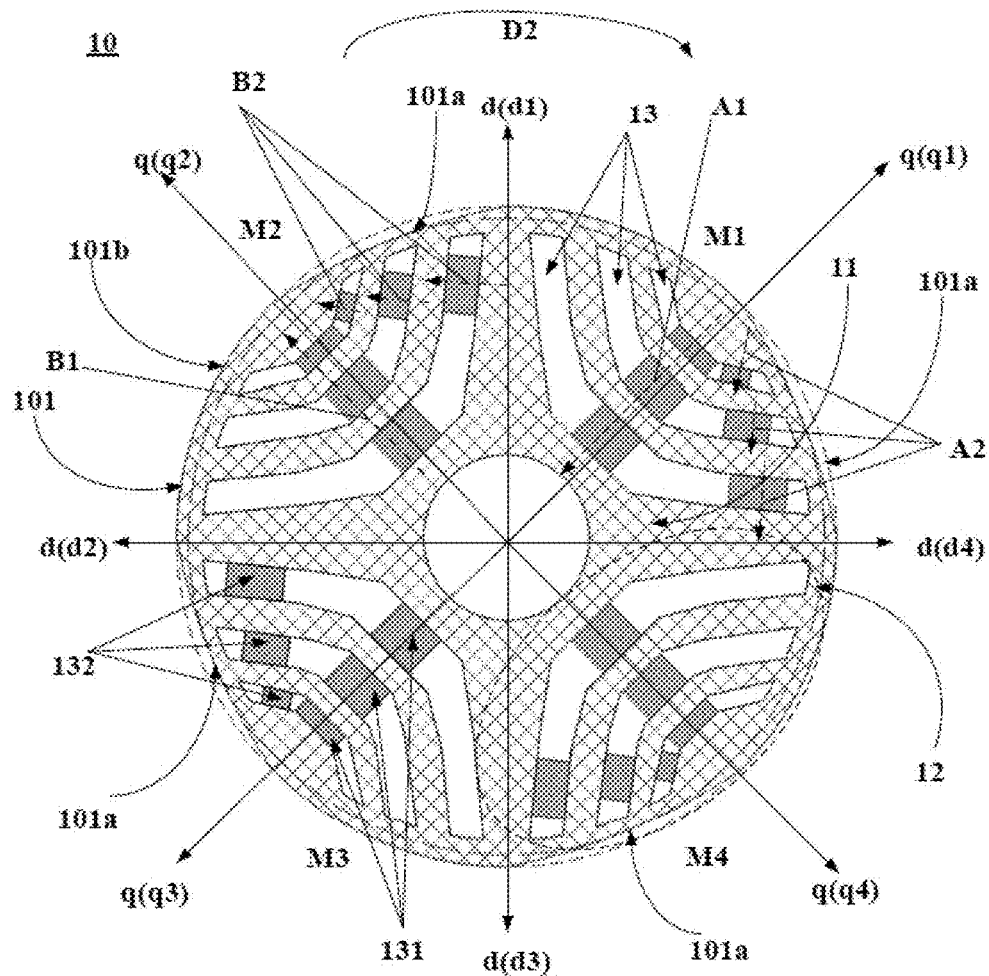
FIG. 2 is a top view of another exemplary embodiment of the rotor according to the embodiments of the first aspect of the disclosure.

FIG. 1 is a top view of an exemplary embodiment of the rotor according to the embodiments of the first aspect of the disclosure. FIG. 2 is a top view of another exemplary embodiment of the rotor according to the embodiments of the first aspect of the disclosure. Because the rotor is defined by electromagnetic steel plates laminated in the axial direction, one end surface of one electromagnetic steel plate in the axial direction is shown in FIG. 1 and FIG. 2.

As shown in FIG. 1 and FIG. 2, a rotor 10 is defined by laminated electromagnetic steel plates 11. The electromagnetic steel plate 11 includes a plurality of through hole groups 12 running through the electromagnetic steel plate 11. One of the through hole groups 12 is indicated by the dashed line circle in FIG. 1 and FIG. 2, and each through hole group 12 includes a plurality of through holes 13. That is, FIG. 1 and FIG. 2 each show four through hole groups 12, and each through hole group 12 includes three through holes 13. A central axis of a magnetic pole of the rotor 10 is used as a d axis, and an axis that is 45 degrees from the d axis is used as a q axis. An outer peripheral surface 101a of the rotor 10 that is between the d axis and the q axis is recessed radially inward relative to an outer peripheral surface 101b of another portion of the rotor 10, so that the rotor 10 is noncircular when observed in the axial direction.

In use of this structure, the outer peripheral surface of the rotor 10 is designed to be noncircular, so that a corresponding current angle obtained when maximum reluctance torque is generated may be adjusted to make a corresponding current angle obtained when maximum flux torque is generated and the corresponding current angle obtained when the maximum reluctance torque is generated as close to each other as possible or in consistence with each other, thereby optimizing a combination of the reluctance torque and the flux torque and achieving the best utilization rate of magnet assistance.

In one or more exemplary embodiments, as shown in FIG. 1 and FIG. 2, the rotor 10 may be divided into four magnetic pole regions M1, M2, M3, and M4 according to a trend of flux of the rotor 10. Each magnetic pole region includes two d axes and one q axis located between the two d axes. The magnetic pole region M1 is used as an example for description. The magnetic pole region M1 includes a d1 axis, a d4 axis, and a q1 axis between the d1 axis and the d4 axis.

For example, as shown in FIG. 1, when the rotor 10 rotates in a counterclockwise direction D1 shown in FIG. 1, in the magnetic pole region M1, the outer peripheral surface 101a of the rotor 10 that is between the d1 axis and the q1 axis that is 45 degrees from the d1 axis in a clockwise direction is recessed radially inward. In the magnetic pole region M2, the outer peripheral surface 101a of the rotor 10 that is between a d2 axis and a q2 axis that is 45 degrees from the d2 axis in the clockwise direction is recessed radially inward. In the magnetic pole region M3, the outer peripheral surface 101a of the rotor 10 that is between a d3 axis and a q3 axis that is 45 degrees from the d3 axis in the clockwise direction is recessed radially inward. In the magnetic pole region M4, the outer peripheral surface 101a of the rotor 10 that is between the d4 axis and a q4 axis that is 45 degrees from the d4 axis in the clockwise direction is recessed radially inward.

For example, as shown in FIG. 2, when the rotor 10 rotates in a clockwise direction D2 shown in FIG. 2, in the magnetic pole region M1, the outer peripheral surface 101a of the rotor 10 that is between the d4 axis and the q1 axis that is 45 degrees from the d4 axis in the counterclockwise direction is recessed radially inward. In the magnetic pole region M2, the outer peripheral surface 101a of the rotor 10 that is between the d1 axis and the q2 axis that is 45 degrees from the d1 axis in the counterclockwise direction is recessed radially inward. In the magnetic pole region M3, the outer peripheral surface 101a of the rotor 10 that is between the d2 axis and the q3 axis that is 45 degrees from the d2 axis in the counterclockwise direction is recessed radially inward. In the magnetic pole region M4, the outer peripheral surface 101a of the rotor 10 that is between the d3 axis and the q4 axis that is 45 degrees from the d3 axis in the counterclockwise direction is recessed radially inward.

Figure 3:
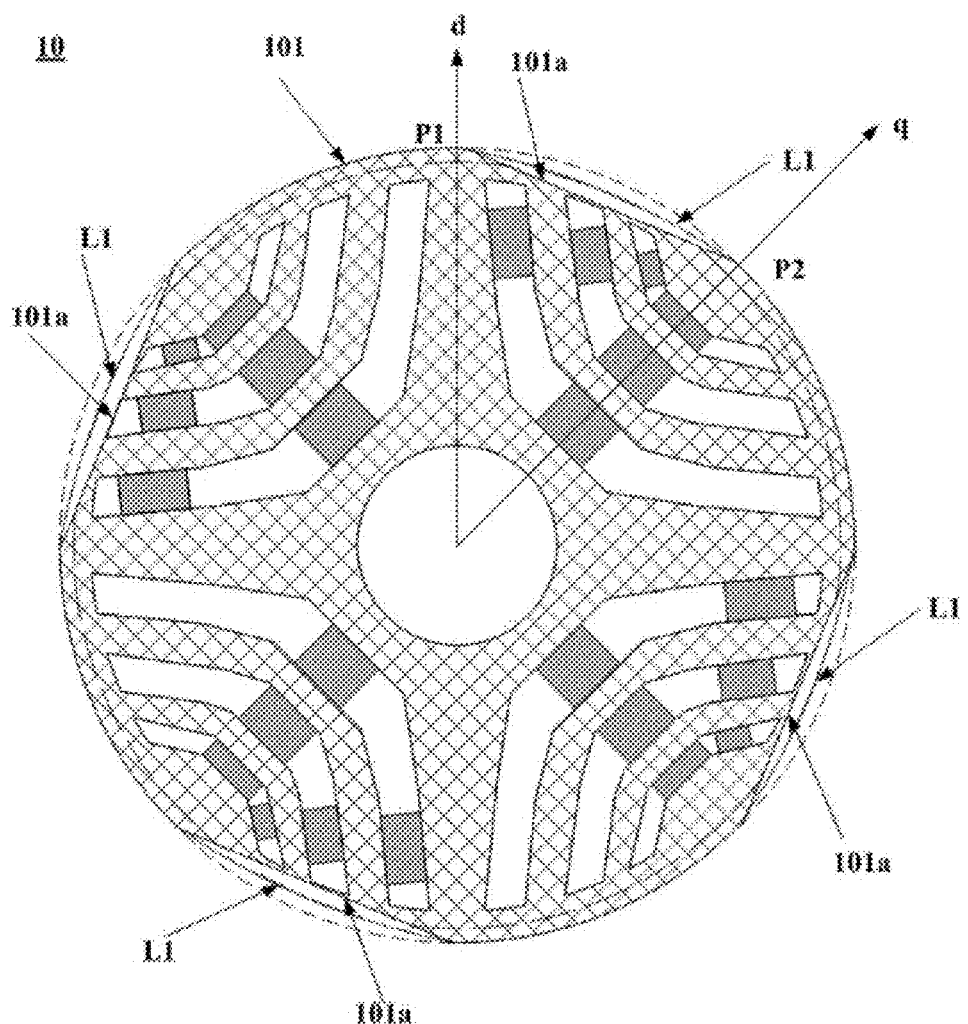
FIG. 3 is a schematic view of a recess degree of the rotor in FIG. 1.
Figure 4:
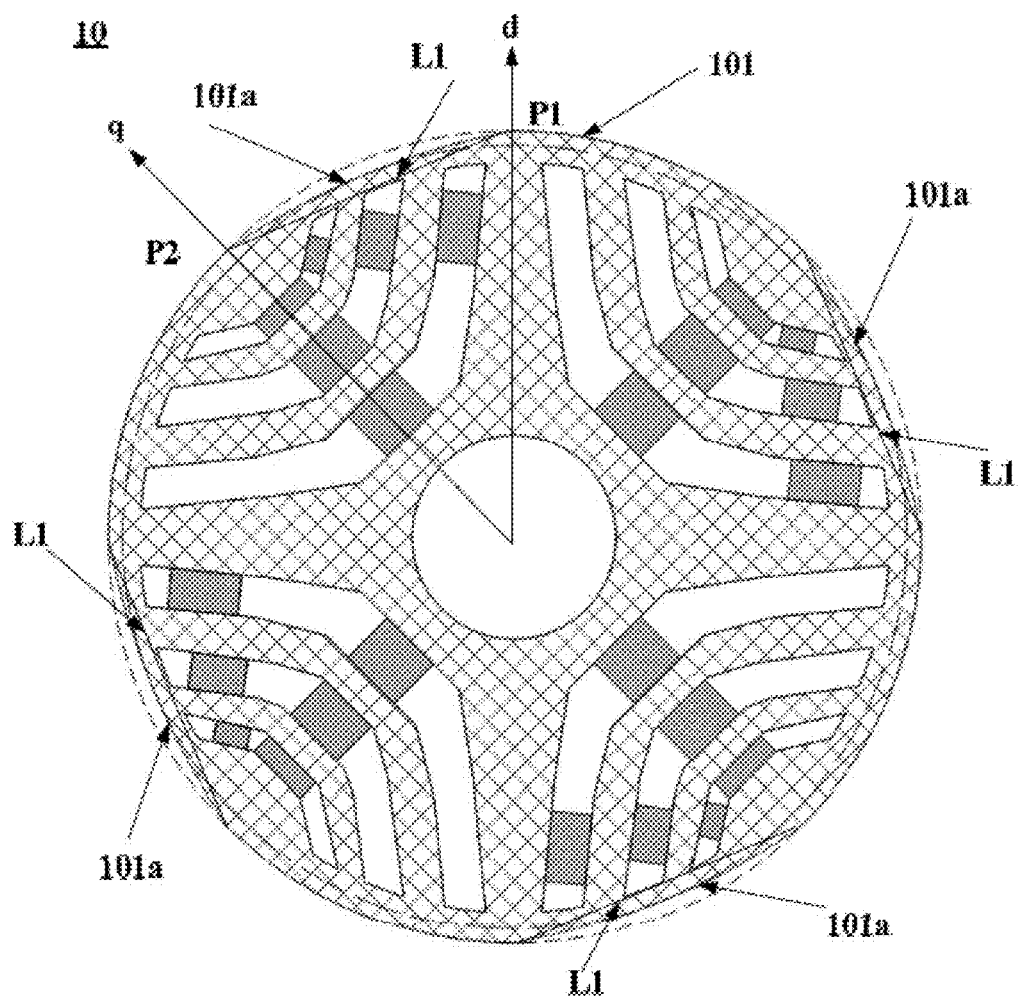
FIG. 4 is a schematic view of another recess degree of the rotor in FIG. 1.

FIG. 3 is a schematic view of a recess degree of the rotor in FIG. 1. FIG. 4 is a schematic view of another recess degree of the rotor in FIG. 1.

In one or more exemplary embodiments, as shown in FIG. 1 and FIG. 2, the outer peripheral surface of the rotor 10 is denoted as 101. The outer peripheral surface 101 is noncircular, and the outer peripheral surface 101 is defined by the outer peripheral surface 101a and the outer peripheral surface 101b.

In one or more exemplary embodiments, a recess degree by which the outer peripheral surface 101a of the rotor 10 is recessed radially inward may be, for example, the following three manners:

Manner 1: As shown in FIG. 1 and FIG. 2, when observed in the axial direction, the outer peripheral surface 101a of the rotor 10 that is between the d axis and the q axis is linear.

Manner 2: As shown in FIG. 3, when observed in the axial direction, the outer peripheral surface 101a of the rotor 10 that is between the d axis and the q axis is further recessed toward a radially inner diameter relative to a straight line L1 defined by an intersection point P1 of the d axis and the outer peripheral surface 101 of the rotor 10 and an intersection point P2 of the q axis and the outer peripheral surface 101 of the rotor 10. In other words, the recess degree, shown in FIG. 3, of the outer peripheral surface 101a of the rotor 10 that is between the d axis and the q axis is greater than the recess degree shown in FIG. 1. Similarly, relative to the appearance of the rotor shown in FIG. 2, the outer peripheral surface 101a of the rotor 10 that is between the d axis and the q axis may also be further recessed radially inward.

Manner 3: As shown in FIG. 4, when observed in the axial direction, the outer peripheral surface 101a of the rotor 10 that is between the d axis and the q axis protrudes radially outward relative to the straight line L1 defined by the intersection point P1 of the d axis and the outer peripheral surface 101 of the rotor 10 and the intersection point P2 of the q axis and the outer peripheral surface 101 of the rotor 10. In other words, when the outer peripheral surface 101a of the rotor 10 that is between the d axis and the q axis is recessed radially inward, the recess degree, shown in FIG. 4, of the outer peripheral surface 101a of the rotor 10 that is between the d axis and the q axis is less than the recess degree shown in FIG. 1. Similarly, relative to the appearance of the rotor shown in FIG. 2, the outer peripheral surface 101a of the rotor 10 that is between the d axis and the q axis may also protrude radially outward. However, the outer peripheral surface 101a is still a structure that is recessed radially inward relative to the full circle defined by the outer peripheral surface 101.

In the exemplary embodiments of the disclosure, no matter which recess degree is used, the objective is to make the corresponding current angle obtained when the maximum flux torque is generated and the corresponding current angle obtained when the maximum reluctance torque is generated as close to each other as possible or in consistence with each other. The recess degree that is specifically adopted may be selected according to the shape and size of the flux barrier of the rotor, the shape and size of the magnet inserted in the flux barrier, and the arrangement position of the magnet.

In one or more exemplary embodiments, as shown in FIG. 1 and FIG. 2, when observed in the axial direction, the plurality of through hole groups 12 are evenly arranged in the circumferential direction, and the plurality of through holes 13 in each through hole group 12 are arranged in the radial direction.

In use of this structure, magnetic induction lines in the rotor 10 are balanced, thereby achieving even flux.

In one or more exemplary embodiments, as shown in FIG. 1 and FIG. 2, when observed in the axial direction, widths of the plurality of through holes 13 in each through hole group 12 in the radial direction gradually decrease in an outwardly radial direction.

Therefore, the flux space on the outer peripheral side of the electromagnetic steel plates forming the rotor is relatively expanded, the magnetic saturation in iron cores of the rotor is reduced, and rotating efficiency of the rotor is improved.

In one or more exemplary embodiments, as shown in FIG. 1 and FIG. 2, a first magnet 131 is accommodated in each through hole 13, and when observed in the axial direction, the first magnet 131 is located substantially at a center of the through hole 13 in the circumferential direction.

Therefore, the flux torque of the rotor 10 is increased.

In one or more exemplary embodiments, as shown in FIG. 1 and FIG. 2, a second magnet 132 is further accommodated in at least one of the plurality of through holes 13 of one through hole group 12, and the second magnet 132 is located between the d axis and the q axis of the through hole 13.

As shown in FIG. 1 and FIG. 2, there is one second magnet 132 arranged in each through hole 13 of one through hole group 12. However, the disclosure is not limited thereto. For example, one second magnet 132 may be arranged in only one of the through holes 13, and no second magnet is arranged in other through holes 13. In addition, there may be at least two second magnets 132 arranged in each through hole 13 of one through hole group 12. In other words, at least two second magnets 132 may be accommodated in at least one through hole 13 of each through hole group 12. Alternatively, at least two second magnets 132 may be accommodated in each through hole 13 of each through hole group 12.

In one or more exemplary embodiments, when the rotor 10 rotates in the counterclockwise direction shown in FIG. 1, the second magnet 132 is located on the left side of the first magnet 131 in the through hole 13. When the rotor 10 rotates in the clockwise direction shown in FIG. 2, the second magnet 132 is located on the right side of the first magnet 131 in the through hole 13. In other words, the second magnet 132 may be arranged only on a single side in the through hole 13. The single side is the side on which the outer peripheral surface 101 of the rotor 10 that is between the d axis and the q axis is recessed radially inward.

In use of this structure, the corresponding current angle obtained when maximum reluctance torque is generated may be adjusted, so that it is easy to make the corresponding current angle obtained when maximum flux torque is generated and the corresponding current angle obtained when the maximum reluctance torque is generated as close to each other as possible or in consistence with each other, thereby easily optimizing a combination of the reluctance torque and the flux torque.

In one or more exemplary embodiments, as shown in FIG. 1 and FIG. 2, in the same through hole 13, the second magnet 132 and the first magnet 131 are disposed at an interval.

In use of this structure, the corresponding current angle obtained when maximum reluctance torque is generated may be further adjusted, so that it is easy to make the corresponding current angle obtained when maximum flux torque is generated and the corresponding current angle obtained when the maximum reluctance torque is generated as close to each other as possible or in consistence with each other, thereby easily optimizing a combination of the reluctance torque and the flux torque.

In one or more exemplary embodiments, as shown in FIG. 1 and FIG. 2, in the circumferential direction, magnetic poles defined by magnets accommodated in adjacent through hole groups 12 are opposite.

For example, as shown in FIG. 1 and FIG. 2, in the magnetic pole region M1, a magnetic pole direction of the first magnet 131 is shown by using a dashed line arrow A1, and a magnetic pole direction of the second magnet 132 is shown by using a dashed line arrow A2; in the magnetic pole region M2, a magnetic pole direction of the first magnet 131 is shown by using a dash-dot line arrow B, and a magnetic pole direction of the second magnet 132 is shown by using a dash-dot line arrow B2, so that a direction (in an inwardly radial direction) of a component of a magnetic pole direction, which is combined by the first magnet 131 and the second magnet 132 in the magnetic pole region M1, in the radial direction is opposite to a direction (in an outwardly radial direction) of a component of a magnetic pole direction, which is combined by the first magnet 131 and the second magnet 132 in the magnetic pole region M2, in the radial direction. In addition, a direction (in the counterclockwise direction) of a component of the magnetic pole direction, which is combined by the first magnet 131 and the second magnet 132 in the magnetic pole region M1, in a direction perpendicular to the radial direction (a tangential direction that is tangent to the outer peripheral surface 101 of the rotor 10) is opposite to a direction (in the clockwise direction) of a component of the magnetic pole direction, which is combined by the first magnet 131 and the second magnet 132 in the magnetic pole region M2, in the direction perpendicular to the radial direction. The magnetic pole regions M3 and M4 are deduced by analogy.

In one or more exemplary embodiments, as shown in FIG. 1 and FIG. 2, the electromagnetic steel plates 11 may include four through hole groups 12. However, the disclosure is not limited thereto. The quantity of the through hole groups 12 may be varied. Usually, the quantity of the through hole groups may be determined by the quantity of poles of the reluctance motor.

In addition, the figure shows that the quantity of the through holes 13 in each through hole group 12 is three. However, the disclosure is not intended to limit the quantity of the through holes 13. That is, the quantity of the through holes 13 in each through hole group 12 may be varied.

In use of this structure, the outer peripheral surface of the rotor 10 in the exemplary embodiments of the disclosure is designed to be noncircular, so that the corresponding current angle obtained when maximum reluctance torque is generated may be adjusted to make a corresponding current angle obtained when maximum flux torque is generated and the corresponding current angle obtained when the maximum reluctance torque is generated as close to each other as possible or in consistence with each other, thereby optimizing a combination of the reluctance torque and the flux torque and achieving the best utilization rate of magnet assistance.

Figure 5:
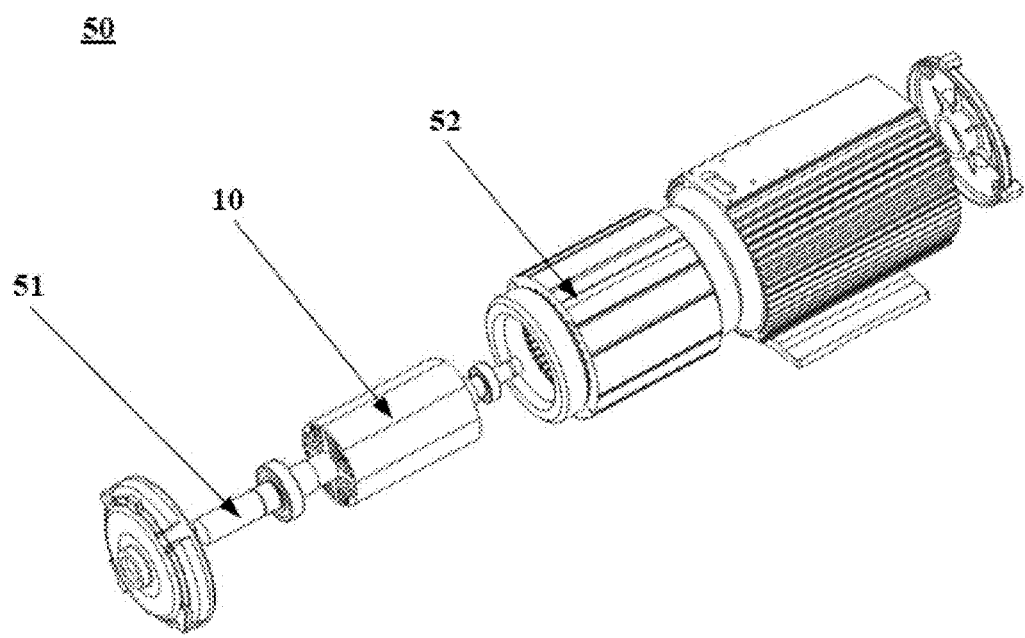
FIG. 5 is a schematic exploded view of a motor according to embodiments of the second aspect of the disclosure.

The embodiments of the second aspect of the disclosure provide a motor. FIG. 5 is a schematic exploded view of the motor according to the embodiments of the second aspect of the disclosure.

As shown in FIG. 5, a motor 50 may include: a rotating shaft 51 extending along a central axis; a stator 52 defined by laminated iron cores and including pole slots (not shown) arranged in the circumferential direction, teeth (not shown) defined between adjacent pole slots, and coils (not shown) accommodated in the pole slots; and a rotor 10 rotating around the rotating shaft 51. Because the structure of the rotor 10 has been described in detail in the embodiments of the first aspect of the disclosure, and content of the rotor 10 is included in the descriptions, the descriptions thereof are omitted herein.

In one or more exemplary embodiments, the motor 50 is a motor that rotates in a single direction.

In one or more exemplary embodiments, other components forming the motor 50 are the same as those in the related art. The descriptions thereof are omitted herein.

In use of this structure of the rotor of the motor in the embodiments of the disclosure, a corresponding current angle obtained when maximum reluctance torque is generated may be adjusted to make a corresponding current angle obtained when maximum flux torque is generated and the corresponding current angle obtained when the maximum reluctance torque is generated as close to each other as possible or in consistence with each other, thereby optimizing a combination of the reluctance torque and the flux torque and achieving the best utilization rate of magnet assistance.

The embodiments of the third aspect of the disclosure provide a driving apparatus. The driving apparatus includes the motor described in the embodiments of the second aspect of the disclosure. Because the main structure of the motor has been described in detail in the embodiments of the second aspect of the disclosure, and content of the motor is included in the descriptions, the descriptions thereof are omitted herein.

In one or more exemplary embodiments, the driving apparatus may be any device in which the motor is mounted. The motor may be applied to an industrial motor, a compression pump, a household appliance, and the like for power transmission.

In use of this structure of the motor of the driving apparatus in the embodiments of the disclosure, a corresponding current angle obtained when maximum reluctance torque is generated may be adjusted to make a corresponding current angle obtained when maximum flux torque is generated and the corresponding current angle obtained when the maximum reluctance torque is generated as close to each other as possible or in consistence with each other, thereby optimizing a combination of the reluctance torque and the flux torque and achieving the best utilization rate of magnet assistance.

The foregoing describes the disclosure with reference to specific embodiments. However, a person skilled in the art should understand that these descriptions are exemplary, and are not intended to limit the protection scope of the disclosure. A person skilled in the art may make various variations and modifications to the disclosure based on the spirit and principles of the disclosure, and those variations and modifications also fall within the scope of the disclosure.

Features of the above-described preferred embodiments and the modifications thereof may be combined appropriately as long as no conflict arises. While preferred embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A rotor, comprising:
    laminated electromagnetic steel plates, each of the laminated electromagnetic steel plates comprising a plurality of through hole groups running therethrough, and each of the plurality of through hole groups comprising a plurality of through holes, wherein
    a central axis of a magnetic pole of the rotor is defined as a d axis,
    an axis that is 45 degrees from the d axis is defined as a q axis,
    an outer peripheral surface of the rotor includes
        a first portion extending from the d axis to the q axis, and
        a second portion extending from the d axis to a further q axis, wherein the further q axis is 45 degrees from the d axis and opposite to the q axis with respect to the d axis,
    only either one of the first portion or the second portion of the outer peripheral surface is recessed radially inward relative to the other of the first portion or the second portion, and
    the rotor is noncircular when observed in an axial direction of the rotor.

2. The rotor according to claim 1, wherein
    when observed in the axial direction, the first or second portion of the outer peripheral surface of the rotor that is recessed radially inward is linear.

3. The rotor according to claim 1, wherein
    when observed in the axial direction, the first or second portion of the outer peripheral surface of the rotor that is recessed radially inward is recessed toward a radially inner diameter relative to a straight line defined by a first intersection point of the d axis with the outer peripheral surface of the rotor and a second intersection point of the q axis with the outer peripheral surface of the rotor.

4. The rotor according to claim 1, wherein
    when observed in the axial direction, the plurality of through hole groups is evenly arranged in a circumferential direction of the rotor.

5. The rotor according to claim 4, wherein
when observed in the axial direction, the plurality of through holes in each of the plurality of through hole group is arranged in a radial direction of the rotor.

6. The rotor according to claim 5, further comprising:
a first magnet accommodated in each through hole of the plurality of through holes, wherein when observed in the axial direction, the first magnet is located at a center of said each through hole of the plurality of through holes.

7. The rotor according to claim 6, further comprising:
a second magnet accommodated in at least one of the plurality of through holes, wherein the second magnet is located between the d axis and the q axis of the at least one of the plurality of through holes.

8. The rotor according to claim 7, wherein
in the at least one of the plurality of through holes, the second magnet and the first magnet are disposed at an interval.

9. The rotor according to claim 8, wherein
in the circumferential direction, magnetic poles defined by magnets including the first and second magnets and accommodated in adjacent through hole groups of the plurality of through hole groups are opposite.

10. A motor rotatable in a single direction, the motor comprising:
a rotating shaft extending along a central axis;
a stator defined by laminated iron cores, and comprising:
a plurality of pole slots arranged in a circumferential direction of the stator,
teeth defined between adjacent pole slots of the plurality of pole slots, and
coils accommodated in the plurality of pole slots; and
a rotor rotatable around the rotating shaft, the rotor comprising laminated electromagnetic steel plates, each of the laminated electromagnetic steel plates comprising a plurality of through hole groups running therethrough, and each of the plurality of through hole groups comprising a plurality of through holes, wherein
a central axis of a magnetic pole of the rotor is defined as a d axis,
an axis that is 45 degrees from the d axis is defined as a q axis,
an outer peripheral surface of the rotor includes
a first portion extending from the d axis to the q axis, and
a second portion extending from the d axis to a further q axis, wherein the further q axis is 45 degrees from the d axis and opposite to the q axis with respect to the d axis,
only either one of the first portion or the second portion of the outer peripheral surface is recessed radially inward relative to the other of the first portion or the second portion, and
the rotor is noncircular when observed in an axial direction of the rotor.

11. A driving apparatus, comprising:
a motor rotatable in a single direction, the motor comprising:
a rotating shaft extending along a central axis,
a stator defined by laminated iron cores, and comprising:
a plurality of pole slots arranged in a circumferential direction of the stator, teeth defined between adjacent pole slots of the plurality of pole slots, and coils accommodated in the plurality of pole slots, and
a rotor rotatable around the rotating shaft, the rotor comprising laminated electromagnetic steel plates, each of the laminated electromagnetic steel plates comprising a plurality of through hole groups running therethrough, and each of the plurality of through hole groups comprising a plurality of through holes, wherein
a central axis of a magnetic pole of the rotor is defined as a d axis,
an axis that is 45 degrees from the d axis is defined as a q axis,
an outer peripheral surface of the rotor includes
a first portion extending from the d axis to the q axis, and
a second portion extending from the d axis to a further q axis, wherein the further q axis is 45 degrees from the d axis and opposite to the q axis with respect to the d axis,
only either one of the first portion or the second portion of the outer peripheral surface is recessed radially inward relative to the other of the first portion or the second portion, and
the rotor is noncircular when observed in an axial direction of the rotor.

* * * * *

UNITED STATES PATENT AND TRADEMARK OFFICE
CERTIFICATE OF CORRECTION

| | |
|---|---|
| PATENT NO. | : 11,418,098 B2 |
| APPLICATION NO. | : 16/847662 |
| DATED | : August 16, 2022 |
| INVENTOR(S) | : Sheng-Chan Yen et al. |

It is certified that error appears in the above-identified patent and that said Letters Patent is hereby corrected as shown below:

On the Title Page

Item (72) Inventors
Change the 5th inventor's address "Taipei(JP)" to -- Taipei(TW) --

Signed and Sealed this
Twentieth Day of December, 2022

Katherine Kelly Vidal
*Director of the United States Patent and Trademark Office*